US011161989B2

(12) United States Patent
Kim et al.

(10) Patent No.: US 11,161,989 B2
(45) Date of Patent: Nov. 2, 2021

(54) NEAR-INFRARED ABSORBING COMPOSITION, OPTICAL STRUCTURE, AND CAMERA MODULE AND ELECTRONIC DEVICE COMPRISING THE SAME

(71) Applicant: Samsung Electronics Co., Ltd., Suwon-si (KR)

(72) Inventors: Mi Jeong Kim, Hwaseong-si (KR); Yoon Seok Ko, Suwon-si (KR); Jong Hoon Won, Yongin-si (KR); Myungsup Jung, Seongnam-si (KR); Sun Jung Byun, Yongin-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 164 days.

(21) Appl. No.: 16/423,468

(22) Filed: May 28, 2019

(65) Prior Publication Data

US 2019/0359834 A1 Nov. 28, 2019

(30) Foreign Application Priority Data

May 28, 2018 (KR) .................. 10-2018-0060401

(51) Int. Cl.
*C07F 9/09* (2006.01)
*H04N 5/225* (2006.01)
(Continued)

(52) U.S. Cl.
CPC .............. *C09D 5/32* (2013.01); *C03C 17/326* (2013.01); *C07F 9/095* (2013.01); *C07F 9/12* (2013.01);
(Continued)

(58) Field of Classification Search
CPC ...... C09D 5/32; C09D 133/00; C09D 163/00; C07F 9/095; C07F 9/12; C08K 5/56; H04N 5/2254; C03C 17/326
See application file for complete search history.

(56) References Cited

U.S. PATENT DOCUMENTS 9,698,186 B2 7/2017 Kawashima et al.
2015/0293283 A1 10/2015 Nara et al.

FOREIGN PATENT DOCUMENTS

CN 101665608 B 4/2011
EP 989419 B1 5/2002
(Continued)

OTHER PUBLICATIONS

E.M. Glebova; V.F. Plyusnin, V.P. Grivin, S.A. Krupoder, T.I. Liskovskaya, V.S. Danilovich, Photochemistry of copper(II) polyfluorocarboxylates and copper(II) acetate as their hydrocarbon analogues, Journal of Photochemistry and Photobiology A: Chemistry 133 (2000) 177-183 (Year: 2000).*

*Primary Examiner* — Bijan Ahvazi
(74) *Attorney, Agent, or Firm* — Harness, Dickey & Pierce, P.L.C.

(57) ABSTRACT

Disclosed are a near-infrared absorbing composition, an optical structure, and a camera module and an electronic device including the same, wherein the near-infrared absorbing composition includes a copper complex represented by Chemical Formula 1:

$(L^1)\text{-Cu-}(L^2)n$      [Chemical Formula 1]

Wherein in Chemical Formula 1, $L^1$, $L^2$, and n are described in the detailed description.

20 Claims, 9 Drawing Sheets

(51) Int. Cl.
  *C03C 17/32* (2006.01)
  *C09D 5/32* (2006.01)
  *C07F 9/12* (2006.01)
  *C09D 133/00* (2006.01)
  *C09D 163/00* (2006.01)
  *C08K 5/56* (2006.01)

(52) U.S. Cl.
  CPC ......... *C09D 133/00* (2013.01); *C09D 163/00* (2013.01); *H04N 5/2254* (2013.01); *C03C 2217/74* (2013.01); *C08K 5/56* (2013.01)

(56) References Cited

FOREIGN PATENT DOCUMENTS

| | | |
|---|---|---|
| JP | 2000095950 A | 4/2000 |
| JP | 4110630 B2 | 7/2008 |
| JP | 5221040 B2 | 6/2013 |
| JP | 6061804 B2 | 1/2017 |
| JP | 2017-142502 A | 8/2017 |
| JP | 6178148 B2 | 8/2017 |
| WO | WO-2014-129291 A1 | 8/2014 |

\* cited by examiner

NEAR-INFRARED ABSORBING COMPOSITION, OPTICAL STRUCTURE, AND CAMERA MODULE AND ELECTRONIC DEVICE COMPRISING THE SAME

CROSS-REFERENCE TO RELATED APPLICATION

This application claims priority to and the benefit of Korean Patent Application No. 10-2018-0060401, filed in the Korean Intellectual Property Office on May 28, 2018, the entire contents of which are incorporated herein by reference.

BACKGROUND

1. Field

A near-infrared absorbing composition, an optical structure, and a camera module and an electronic device including the same are disclosed.

2. Description of the Related Art

Recently, an electronic device including an image sensor that stores an image as an electrical signal, such as a cell phone, a digital camera, a camcorder and a camera, has been widely used.

This electronic device may include an optical filter having a near-infrared absorption capability in order to reduce or prevent generation of an optical distortion by light in the other regions than a visible region.

The optical filter is generally mounted in front of an image sensor of a camera module and thus plays a role of effectively absorbing an incident near-infrared ray and resolving the optical distortion phenomenon.

Recently, many attempts to make the optical filter into a thin film have been made according to a requirement of down-sizing and highly integrating an electronic device. However, when the thin-film optical filter is used to observe and take a picture of a high luminance subject, it may cause a flare phenomenon such as a Wi-Fi-type flare phenomenon that an outline is generated around the subject, a petal flare phenomenon that light is irradiated with the subject as the center, and the like.

This flare phenomenon is an optical distortion phenomenon generated when an image sensor in an electronic device recognizes light in a visible wavelength region and infrared to near-infrared wavelength regions together.

Accordingly, in order to reduce and/or minimize the optical distortion phenomenon, light in the near-infrared wavelength region not recognized by human eyes due to a luminosity difference of the human eyes and the image sensor may need to be absorbed or reflected and thus limited and/or blocked.

SUMMARY

A near-infrared absorbing composition having near-infrared absorbance and solubility in an organic solvent and low visible absorbance is provided.

In addition, an optical structure formed using the near-infrared absorbing composition and a camera module and an electronic device including the same are provided.

According to an embodiment, a near-infrared absorbing composition including a copper complex represented by Chemical Formula 1 is provided.

$$(L^1)\text{-Cu-}(L^2)_n \quad \text{[Chemical Formula 1]}$$

In Chemical Formula 1,
 $L^1$ is a ligand represented by Chemical Formula A,
 $L^2$ is a ligand selected from a substituted or unsubstituted phosphate group, a substituted or unsubstituted phosphonate group, a substituted or unsubstituted sulfate group, and a substituted or unsubstituted sulfonate group, and
 n is 1 to 4.

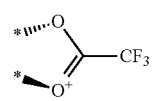

[Chemical Formula A]

In Chemical Formula A,
 * is a linking point with Cu.
 In some embodiments, $L^2$ may be a ligand represented by Chemical Formula B.

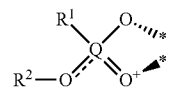

[Chemical Formula B]

In Chemical Formula B,
 Q is S or P,
 $R^1$ and $R^2$ are independently selected from hydrogen, deuterium, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C4 to C20 heteroaryl group, $-OR^{b1}$, $-C(=O)_R^{b2}$, $-OC(=O)R^{b3}$ (wherein $R^{b1}$, $R^{b2}$, and $R^{b3}$ are independently selected from hydrogen, deuterium, a substituted or unsubstituted C1 to C20 alkyl group, a substituted or unsubstituted C1 to C20 alkenyl group, a substituted or unsubstituted C6 to C20 aryl group, and a substituted or unsubstituted C4 to C20 heteroaryl group), and a functional group represented by Chemical Formula X, and
 * is a linking point with Cu.

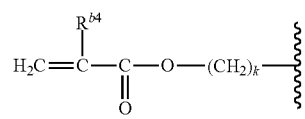

[Chemical Formula X]

In Chemical Formula X,
 $R^{b4}$ is selected from hydrogen, deuterium, a substituted or unsubstituted C1 to C20 alkyl group, a substituted or unsubstituted C1 to C20 heteroalkyl group, a substituted or unsubstituted C6 to C20 aryl group, and a substituted or unsubstituted C4 to C20 heteroaryl group, and
 k is an integer ranging from 0 to 8.
 In some embodiments, $L^2$ may be a ligand represented by Chemical Formula B-1.

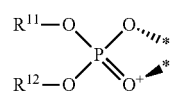

[Chemical Formula B-1]

In Chemical Formula B-1,

R[11] and R[12] are independently selected from hydrogen, deuterium, a substituted or unsubstituted C1 to C20 alkyl group, a substituted or unsubstituted C1 to C20 heteroalkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C4 to C20 heteroaryl group, and a functional group represented by Chemical Formula X, and

* is a linking point with Cu.

[Chemical Formula X]

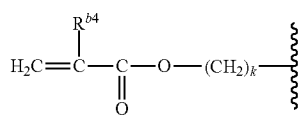

In Chemical Formula X,

R[b4] is selected from hydrogen, deuterium, a substituted or unsubstituted C1 to C20 alkyl group, a substituted or unsubstituted C1 to C20 heteroalkyl group, a substituted or unsubstituted C6 to C20 aryl group, and a substituted or unsubstituted C4 to C20 heteroaryl group, and k is an integer ranging from 0 to 8.

In some embodiments, at least one of R[11] and R[12] may be selected from a substituted or unsubstituted C1 to 10 linear or branched alkyl group, a substituted or unsubstituted C1 to C10 aryl group, and the functional group represented by Chemical Formula X.

In some embodiments, L² may include a ligand represented by Chemical Formula B-2.

[Chemical Formula B-2]

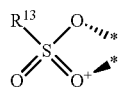

In Chemical Formula B-2,

R[13] is selected from hydrogen, deuterium, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C4 to C20 heteroaryl group, —OR[b1], —C(=O)R[b2], —OC(=O)R[b3] (wherein R[b1], R[b2], and R[b3] are independently selected from hydrogen, deuterium, a substituted or unsubstituted C1 to C20 alkyl group, a substituted or unsubstituted C1 to C20 alkenyl group, a substituted or unsubstituted C6 to C20 aryl group, and a substituted or unsubstituted C4 to C20 heteroaryl group), and a functional group represented by Chemical Formula X, and

* is a linking point with Cu.

[Chemical Formula X]

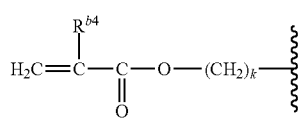

In Chemical Formula X,

R[b4] is selected from hydrogen, deuterium, a substituted or unsubstituted C1 to C20 alkyl group, a substituted or unsubstituted C1 to C20 heteroalkyl group, a substituted or unsubstituted C6 to C20 aryl group, and a substituted or unsubstituted C4 to C20 heteroaryl group, and k is an integer ranging from 0 to 8.

In some embodiments, R[13] may be selected from a substituted or unsubstituted C1 to 10 linear or branched alkyl group and a substituted or unsubstituted C1 to C10 aryl group.

In some embodiments, the near-infrared absorbing composition may further include one of tetrahydrofuran, ethanol, butanol, acetone, methylethylketone, 1-methoxy-2-propanol, cyclopentanone, or a combination thereof.

In some embodiments, the near-infrared absorbing composition may further include a thermally or photo-crosslinkable monomer.

In some embodiments, the thermally or photo-crosslinkable monomer may include an acryl-based monomer, an epoxy-based monomer, or a combination thereof.

In some embodiments, the near-infrared absorbing composition may have a maximum absorption wavelength of about 790 nm to about 900 nm.

According to another embodiment, an optical structure including a near-infrared absorption layer formed using the near-infrared absorbing composition is provided.

In some embodiments, the copper complex may be included in an amount of about 50 wt % to about 100 wt % based on a total weight of the near-infrared absorption layer.

In some embodiments, the near-infrared absorption layer may further include an acryl-based polymer, an epoxy-based polymer, or a combination thereof.

In some embodiments, the optical structure may further include a transparent substrate contacting the near-infrared absorption layer.

In some embodiments, the optical structure may further include a near-infrared reflection layer on at least one of one surface of the transparent substrate and one surface of the near-infrared absorption layer.

In some embodiments, the optical structure may have an average light transmittance of greater than or equal to about 80% in a wavelength region of about 430 nm to about 565 nm.

In some embodiments, the optical structure may have an average light transmittance of less than or equal to about 15% in a wavelength region of about 740 nm to about 1000 nm wavelength region.

In some embodiments, the optical structure may have an average light transmittance of less than or equal to about 25% in a wavelength region of about 700 nm to about 1200 nm.

According to another embodiment, a camera module includes a lens; an image sensor; and the optical structure between the lens and the image sensor and/or an electronic device includes the optical structure.

The near-infrared absorbing composition according to an embodiment has excellent near-infrared absorbance and low visible absorbance and thus may minimize the optical distortion and obtain a vivid image and in addition, has excellent solubility in an organic solvent and thus may form an optical structure having an excellent coating property and high reliability.

In addition, a camera module and an electronic device including the optical structure according to an embodiment may provide an image having a limited and/or minimized optical distortion.

DETAILED DESCRIPTION

Figure 1:
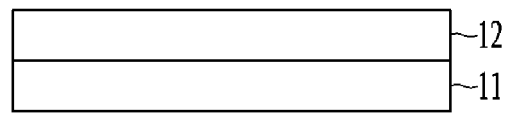
FIG. 1 is a schematic cross-sectional view showing an optical structure according to an embodiment.

Hereinafter, example embodiments of the present disclosure will be described in detail so that a person skilled in the art would understand the same. Inventive concepts, however, be embodied in many different forms and should not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a near-infrared absorbing composition according to an embodiment is described.

The near-infrared absorbing composition according to an embodiment includes a copper complex represented by Chemical Formula 1.

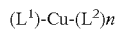    [Chemical Formula 1]

In Chemical Formula 1, $L^1$ is a ligand represented by Chemical Formula A, $L^2$ is a ligand selected from a substituted or unsubstituted phosphate group, a substituted or unsubstituted phosphonate group, a substituted or unsubstituted sulfate group, and a substituted or unsubstituted sulfonate group, and n is 1 to 4.

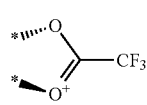    [Chemical Formula A]

In Chemical Formula A, * is a linking point with Cu.

In an embodiment, $L^2$ may include a ligand represented by Chemical Formula B.

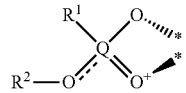    [Chemical Formula B]

In Chemical Formula B,

Q is S or P, $R^1$ and $R^2$ are independently selected from hydrogen, deuterium, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C4 to C20 heteroaryl group, $-OR^{b1}$, $-C(=O)R^{b2}$, $-OC(=O)R^{b3}$ (wherein $R^{b1}$, $R^{b2}$, and $R^{b3}$ are independently selected from hydrogen, deuterium, a substituted or unsubstituted C1 to C20 alkyl group, a substituted or unsubstituted C2 to C20 alkenyl group, a substituted or unsubstituted C6 to C20 aryl group, and a substituted or unsubstituted C4 to C20 heteroaryl group), and a functional group represented by Chemical Formula X, and

* is a linking point with Cu.

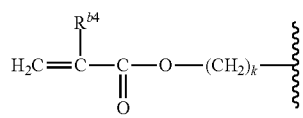    [Chemical Formula X]

In Chemical Formula X, $R^{b4}$ is selected from hydrogen, deuterium, a substituted or unsubstituted C1 to C20 alkyl group, a substituted or unsubstituted C1 to C20 heteroalkyl group, a substituted or unsubstituted C6 to C20 aryl group, and a substituted or unsubstituted C4 to C20 heteroaryl group, and k is an integer ranging from 0 to 8.

In an embodiment, $L^2$ may include a ligand represented by Chemical Formula B-1.

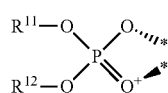    [Chemical Formula B-1]

In Chemical Formula B-1, $R^{11}$ and $R^{12}$ are independently selected from hydrogen, deuterium, a substituted or unsubstituted C1 to C20 alkyl group, a substituted or unsubstituted C1 to C20 heteroalkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C4 to C20 heteroaryl group, and a functional group represented by Chemical Formula X, and

* is a linking point with Cu.

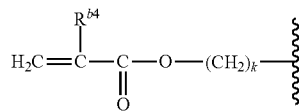    [Chemical Formula X]

In Chemical Formula X, $R^{b4}$ is selected from hydrogen, deuterium, a substituted or unsubstituted C1 to C20 alkyl group, a substituted or unsubstituted C1 to C20 heteroalkyl group, a substituted or unsubstituted C6 to C20 aryl group, and a substituted or unsubstituted C4 to C20 heteroaryl group, and k is an integer ranging from 0 to 8.

In an embodiment, at least one of R11 and R12 may be selected from a substituted or unsubstituted C1 to 10 linear or branched alkyl group, a substituted or unsubstituted C1 to C10 aryl group, and the functional group represented by Chemical Formula X.

In an embodiment, $L^2$ may include a ligand represented by Chemical Formula B-2.

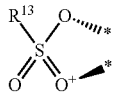

[Chemical Formula B-2]

In Chemical Formula B-2, $R^{13}$ is selected from hydrogen, deuterium, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C4 to C20 heteroaryl group, $-OR^{b1}$, $-C(=O)R^{b2}$, $-OC(=O)R^{b3}$ (wherein $R^{b1}$, $R^{b2}$, and $R^{b3}$ are independently selected from hydrogen, deuterium, a substituted or unsubstituted C1 to C20 alkyl group, a substituted or unsubstituted C1 to C20 alkenyl group, a substituted or unsubstituted C6 to C20 aryl group, and a substituted or unsubstituted C4 to C20 heteroaryl group), and a functional group represented by Chemical Formula X, and

* is a linking point with Cu.

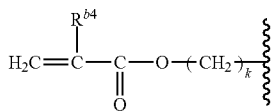

[Chemical Formula X]

In Chemical Formula X, $R^{b4}$ is selected from hydrogen, deuterium, a substituted or unsubstituted C1 to C20 alkyl group, a substituted or unsubstituted C1 to C20 heteroalkyl group, a substituted or unsubstituted C6 to C20 aryl group, and a substituted or unsubstituted C4 to C20 heteroaryl group, and k is an integer ranging from 0 to 8.

In an embodiment, R13 may be selected from a substituted or unsubstituted C1 to 10 linear or branched alkyl group, and a substituted or unsubstituted C1 to C10 aryl group.

The near-infrared absorbing composition according to an embodiment may further include a solvent. In an embodiment, the solvent may be an organic solvent. Examples of the organic solvent may be tetrahydrofuran, ethanol, butanol, acetone, methylethylketone, 1-methoxy-2-propanol, cyclopentanone, or a combination thereof. That is, the copper complex according to an embodiment may have improved solubility in the organic solvent.

The near-infrared absorbing composition according to an embodiment may further include a thermally cross-linkable or photo-cross-linkable monomer. Examples of the cross-linkable monomer may be an acryl-based monomer, an epoxy-based monomer, or a combination thereof. The cross-linkable monomer may perform a binder function, when the near-infrared absorbing composition is used to form a near-infrared absorption layer.

In an embodiment, the cross-linkable monomer may have a photo-polymerization property, wherein the near-infrared absorbing composition may further include an additive for initiating a photopolymerization reaction among the cross-linkable monomers, for example, a photoinitiator and the like. However, the near-infrared absorbing composition of an embodiment is not necessarily limited thereto, but the cross-linkable monomer may have a thermal polymerization property, and the near-infrared absorbing composition may include a different polymer binder from the cross-linkable monomer, a surfactant, an anti-oxidizing agent, and the like.

On the other hand, the near-infrared absorbing composition according to an embodiment may further include an organic dye having near-infrared absorption capability in addition to the copper complex. Examples of the organic dye may include squarylium, cyanine, phthalocyanine, thiophene, diimmonium, or a combination thereof.

The organic dye has a narrower line width of a near-infrared absorption wavelength is narrower than that of the copper complex and thus may be used together with the copper complex, when absorption capability regarding light in a particularly narrow wavelength region among near-infrared rays needs to be complemented. In other words, the near-infrared absorbing composition according to an embodiment may further include at least one kind of organic dye having absorption capability regarding light in a particular near-infrared ray wavelength region requiring of the complement along with the copper complex.

On the other hand, a near-infrared absorption material may generally be classified into an organic material and an inorganic material, and examples of the organic material may include an organic dye as described above, and example of the inorganic material may include a soluble metal complex, for example, copper-phosphate and the like. This metal complex in general has a structure that at least one same kinds of ligands are combined with a central metal (e.g., copper).

The organic material shows excellent near-infrared absorbance but has a narrow line width of a near-infrared absorption wavelength, as described above. Accordingly, the organic material alone may rarely absorb light in a wide near-infrared wavelength region ranging from about 700 nm to about 1200 nm, and thus several kinds of organic materials need to be stacked. Herein, since light transmittance in a visible light wavelength region of a near-infrared absorption layer using the organic material may be deteriorated, there is a limit in increasing the stacking number of the near-infrared absorption layer.

Since the inorganic material has lower near-infrared absorbance than the organic material, a thickness of the near-infrared absorption layer using the inorganic material needs to be formed to be a little thicker than that of the near-infrared absorption layer using the organic material in order to secure absorbance (e.g., about 50 μm to about 200 μm). The inorganic material shows excellent light transmittance of a visible light wavelength region and a small light loss due to the visible light absorption despite increasing the thickness.

However, in order to realize the thickness, the inorganic material should be dissolved in a high concentration (e.g., greater than or equal to about 50 wt %) in an organic solvent, but a general inorganic material show excellent dissolubility in a polar solvent (e.g., an alcohol based solvent, an aqueous solution, and the like) but insufficient dissolubility in the organic solvent.

A method of improving near-infrared absorbance of the inorganic material may be to increase an amount of copper per unit volume (e.g., to decrease a molecular weight of a ligand combined into copper). In other words, in a generally-used inorganic material, for example, a copper complex having two phosphate-based ligands, the amount of copper per unit volume may be increased by making a length of hydrocarbon short, when an alkyl-based functional group is substituted for a part of phosphate-based ligand.

However, the above method may deteriorate dissolubility in an organic solvent, as the molecular weight of the ligand is decreased, and accordingly, a near-infrared absorption layer having the above thickness may be difficult to form.

However, the copper complex according to an embodiment includes a tetrafluoro acetate ligand of $L^1$ and an acidic ligand including P or S of $L^2$. In other words, the copper complex according to an embodiment may include two different kinds of ligands ($L^1$ and $L^2$) respectively having a coordination bond into copper unlike a general inorganic material. In an embodiment, $L^1$ may function as a ligand capable of securing solubility in an organic solvent, and $L^2$ may function as a ligand capable of securing absorption capability of light in a near-infrared wavelength region.

Accordingly, a copper complex having two kinds of ligands like the copper complex according to an embodiment may maintain dissolubility in an organic solvent despite decreasing a molecular weight of the ligand and in addition, adjust a maximum absorption wavelength of a near-infrared absorbing composition within a particular range, for example, of greater than or equal to about 790 nm, greater than or equal to about 800 nm, or greater than or equal to about 810 nm, less than or equal to about 900 nm, less than or equal to about 860 nm, about 790 nm to about 900 nm, or about 790 nm to about 860 nm.

Accordingly, the near-infrared absorbing composition according to an embodiment may be easily formed into a thick near-infrared absorption layer having a thickness of about 50 μm to about 200 μm. In addition, the near-infrared absorption layer may show excellent near-infrared absorbance and low visible absorbance due to the above near-infrared absorbing composition.

Hereinafter, an optical structure according to an embodiment, that is, an optical structure including a near-infrared absorption layer manufactured using the composition is described with reference to drawings.

FIG. 1 is a schematic cross-sectional view showing an optical structure according to another embodiment.

Referring to FIG. 1, an optical structure 10 includes a near-infrared absorption layer 12. In an embodiment, one example of the optical structure 10 illustrates the near-infrared absorption layer 12 formed on a transparent substrate 11. However, the present scope is not necessarily limited thereto. For example, the optical structure according may be formed directly on an image sensor, not on a transparent substrate, or may be a film structure (e.g., thin-film structure) having a surface covered with a release paper or the like.

However, the optical structure 10 according to an embodiment is not necessarily limited thereto, but the near-infrared absorption layer 12 may be formed as a monolayer or a multilayer of at least two layers, and herein, when the near-infrared absorption layer 12 is formed as a multilayer, an overcoating layer preventing transmission of an interface adhesive among layers, oxygen, and moisture, the near-infrared absorption layer 12, and another layer performing near-infrared absorption and/or reflection may be included therein.

In an embodiment, the transparent substrate 11 may be made of an optically transparent substrate and may have, for example an average light transmittance of greater than or equal to about 80%, greater than or equal to about 85%, or greater than or equal to about 90% in a visible region. Herein, the visible region may be for example a wavelength region of greater than about 380 nm and less than about 700 nm and the average light transmittance is an average value of light transmittance measured when incident light is radiated in a vertical direction (front direction) of the transparent substrate 11.

The transparent substrate 11 may include, for example glass, polyethyleneterephthalate, triacetyl cellulose, polycarbonate, cycloolefin polymer, poly(meth)acrylate, polyimide, polystyrene, or a combination thereof, but is not limited thereto.

The transparent substrate 11 may selectively absorb at least one part of light in an ultraviolet (UV) region. Ultraviolet (UV) absorption capability of the transparent substrate 11 may be caused by a material itself of the transparent substrate 11, but the transparent substrate 11 having ultraviolet (UV) absorption capability may be formed by adding an ultraviolet (UV) absorber thereto. Herein, the ultraviolet (UV) region may be, for example, a wavelength region of less than or equal to about 380 nm.

The transparent substrate 11 may absorb most of light in a wavelength region of at least about 350 nm to about 380 nm, and thus an average light transmittance of the optical structure 10 in a wavelength region of about 350 nm to about 380 nm may be less than or equal to about 1%, less than or equal to about 0.8%, or less than or equal to about 0.5%.

The transparent substrate 11 may include various additives according to desirable properties of the optical structure 10.

The transparent substrate 11 may have a thickness of about 20 μm to about 120 μm.

The transparent substrate 11 may be formed as a multilayer of at least two layers if needed, or omitted.

The near-infrared absorption layer 12 is configured to transmit light in a visible region and to selectively absorb at least one part of light in a near-infrared region. Herein, the visible region may be for example a wavelength region of greater than about 380 nm and less than about 700 nm and the near-infrared region may be for example a wavelength region of about 700 nm to about 1200 nm.

The near-infrared absorption layer 12 includes the copper complex and may further include a thermally cross-linkable or photo-cross-linkable polymer, a surfactant, an anti-oxidizing agent, a photoinitiator, and the like.

In an embodiment, the copper complex in the near-infrared absorption layer 12 may be included in an appropriate amount so that the near-infrared absorption layer 12 may have a desirable near-infrared absorption capability. In an embodiment, the copper complex may be for example included in an amount of greater than or equal to about 50 wt %, greater than or equal to about 60 wt %, greater than or equal to about 70 wt %, greater than or equal to about 80 wt %, greater than or equal to about 90 wt %, greater than or equal to about 95 wt %, or even about 100 wt % (the near-infrared absorption layer consists of the copper complex) based on the total weight of the near-infrared absorption layer 12.

In an embodiment, the thermally cross-linkable or photo-cross-linkable polymer may be prepared by polymerizing a cross-linkable monomer included in the above optical structure by heat or light. Examples of the polymer may be an acryl-based polymer, an epoxy-based polymer, or a combination thereof.

The near-infrared absorption layer 12 may be formed by coating the near-infrared absorbing composition on the transparent substrate 11 and polymerizing the thermally or photo-cross-linkable monomer. In other words, the near-infrared absorption layer 12 may be formed through a polymerization reaction of the photo-cross-linkable monomer in the near-infrared absorption composition.

The polymerization reaction may be different depending on characteristics of the cross-linkable monomer forming the polymer, for example, performed by heat and/or light.

The composition coated on the transparent substrate 11 may be selectively curable by heat and/or light and the coating may be for example a spin coating, a slit coating, a bar coating, a blade coating, a slot die coating, and/or an inkjet coating.

The near-infrared absorption layer 12 of the optical structure 10 may have, for example a thickness of about 10 μm to about 200 μm, for example about 50 μm to about 200 μm, or about 50 μm to about 150 μm. Within the thickness range, the optical structure 10 may realize performance of an optical filter.

However, an embodiment is necessarily limited thereto, a thickness of the near-infrared absorption layer 12 may be variously set with a consideration to presence and a kind of other organic dyes for near-infrared absorption in addition to the copper complex in the near-infrared absorption layer 12 and their relationship with other constituent elements consisting of the optical structure, for example, a transparent substrate, a near-infrared reflection layer, and the like.

The optical structure 10 according to the present embodiment transmits light in a visible region effectively and limits and/or blocks light in a near-infrared region effectively even if the transparent substrate 11 and the near-infrared absorption layer 12 are sequentially stacked.

In addition, light in an ultraviolet (UV) region may be effectively limited and/or blocked by imparting an absorption function of light in an ultraviolet (UV) region to the transparent substrate 11. Accordingly, the optical structure 10 may effectively sense light in a visible region in a sensor sensing light such as an image sensor by increasing purity of transmittance of light in a visible region of light in all wavelength regions and thus optical distortion by light besides the visible region may be decreased or prevented.

For example, the optical structure 10 may have average light transmittance of greater than or equal to about 80%, for example greater than or equal to about 85%, or greater than or equal to about 88% in a wavelength region of about 435 nm to about 565 nm, an average light transmittance of less than or equal to about 15%, for example less than or equal to about 12% in a wavelength region of about 740 nm to about 1000 nm, and an average light transmittance of less than or equal to about 25%, less than or equal to about 24%, less than or equal to about 23%, or less than or equal to about 22% in a wavelength region of about 700 nm to about 1200 nm. The average light transmittance is an average value of light transmittance measured when incident light is radiated in a vertical direction (front direction) of the optical structure 10.

In this way, the optical structure 10 selectively absorbs and thus limits and/or blocks light in a near-infrared wavelength region corresponding to a boundary between a visible region and an infrared region out of all the wavelength region and thus reduces or prevents crossing and mingling of a signal by light in a visible region with a signal by light in a nonvisible region and resultantly, may reduce or prevent an optical distortion such as a crosstalk.

In addition, the optical structure 10 may effectively absorb light in a near-infrared region regardless of an incident direction and accordingly, effectively absorb and limit and/or block incident light in a near-infrared region from a side direction and thus reduce or prevent the incident light in a near-infrared region from a side direction from distorting the signal of visible light.

In addition, the optical structure 10 may show excellent near-infrared absorbance and low visible absorbance due to the above near-infrared absorbing composition. Furthermore, the optical structure 10 shows excellent dissolubility in an organic solvent and thus excellent coating properties (coating uniformity, easy coating process, and the like) and also, excellent reliability about optical properties of the formed near-infrared absorption layer 12.

Figure 2:
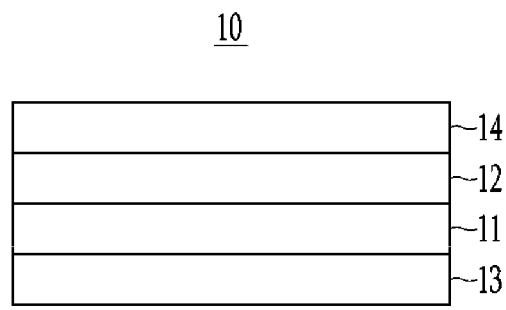
FIG. 2 is a schematic cross-sectional view showing an optical structure according to another embodiment.

FIG. 2 is a schematic cross-sectional view showing an optical structure according to one example variation.

Referring to FIG. 2, the optical structure 10 according to one example variation includes a transparent substrate 11, a near-infrared absorption layer 12, and near-infrared reflection layers 13 and 14.

The transparent substrate 11 and the near-infrared absorption layer 12 are the same as described above.

The near-infrared reflection layers 13 and 14 may be disposed on at least one of one surface of the transparent substrate and one surface of the near-infrared absorption layer. For example, the near-infrared reflection layers 13 and 14 may be disposed under the transparent substrate 11 and/or on the near-infrared absorption layer 12. In the view, the near-infrared reflection layers 13 and 14 are shown, but either of them may be omitted.

The near-infrared reflection layers 13 and 14 effectively reflect light in an infrared wavelength region and thus may effectively reduce or prevent optical distortion by the light in an infrared wavelength region.

The near-infrared reflection layers 13 and 14 may reflect light in a mid-infrared region, a far-infrared region, and a part of a near-infrared region, for example, a wavelength region of about 700 nm to about 3 μm.

The near-infrared reflection layers 13 and 14 are not particularly limited as long as they reflect light in an infrared wavelength region and may be, for example a high refractive index reflective layer, a reflective layer including a high refractive index nanoparticle, or a multilayer including a plurality of layers having different refractive indexes, but is not limited thereto.

For example, the near-infrared reflection layers 13 and 14 may include a first layer and a second layer consisting materials having different refractive indexes, and may include a multilayer where the first layer and the second layer are alternately and repeatedly stacked.

The first layer and the second layer may be, for example a dielectric layer including an oxide layer, a nitride layer, an oxynitride layer, a sulfide layer, or a combination thereof, and for example the first layer may have a refractive index of less than about 1.7 and the second layer may have a refractive index of greater than or equal to about 1.7. Within the ranges, for example the first layer may have a refractive index of greater than or equal to about 1.1 and less than about 1.7 and the second layer may have a refractive index about 1.7 to about 2.7, or for example the first layer may have a refractive index of about 1.2 to about 1.6 and the second layer may have a refractive index of about 1.8 to about 2.5.

The first layer and the second layer may include any material having the refractive indexes within the ranges, and for example the first layer may include a silicon oxide, an aluminum oxide, or a combination thereof and the second layer may include titanium oxide, zinc oxide, indium oxide, zirconium oxide, or a combination thereof. The first layer and the second layer may be, for example five-layered to 80-layered, for example 5-layered to 50-layered.

Thicknesses of the first layer and the second layer may be determined according to a refractive index and a reflection wavelength of each layer, for example each of the first layer may have a thickness of about 10 nm to about 700 nm and each of the second layer may have a thickness of about 30 nm to about 600 nm. Thicknesses of the first layer and the second layer may be the same or different.

The optical structure 10 may have, for example a thickness of 10 μm to about 200 μm. Within the ranges of the thickness, an infrared absorption optical filter may be realized.

The optical structure 10 according to the present embodiment includes the transparent substrate 11 and the near-infrared absorption layer 12 like the above embodiment and transmits light in a visible region effectively and limits and/or blocks light in a near-infrared region effectively. In addition, the optical structure 10 according to the embodiment further includes near-infrared reflection layers 13 and 14, thereby effectively limits and/or blocks light in a mid-infrared region and a far-infrared region by reflecting them, and thus may be effectively used as an optical filter preventing transmittance of light in all the infrared regions. Accordingly, the optical structure 10 may be applied to an electronic device and thus may reduce or prevent distortion of an optical signal in a visible region by light in the infrared region.

The optical structure 10 may be applied to all uses for filtering light in an infrared or near-infrared wavelength region, and may be, for example applied to a camera module and an electronic device including the same. The electronic device may be a digital camera, a camcorder, a monitoring camera such as CCTV, an in-car camera, a medical camera, a cell phone having a built-in or external camera, a computer having a built-in or external camera, a laptop computer having a built-in or external camera, and the like but is not limited thereto.

Figure 3:
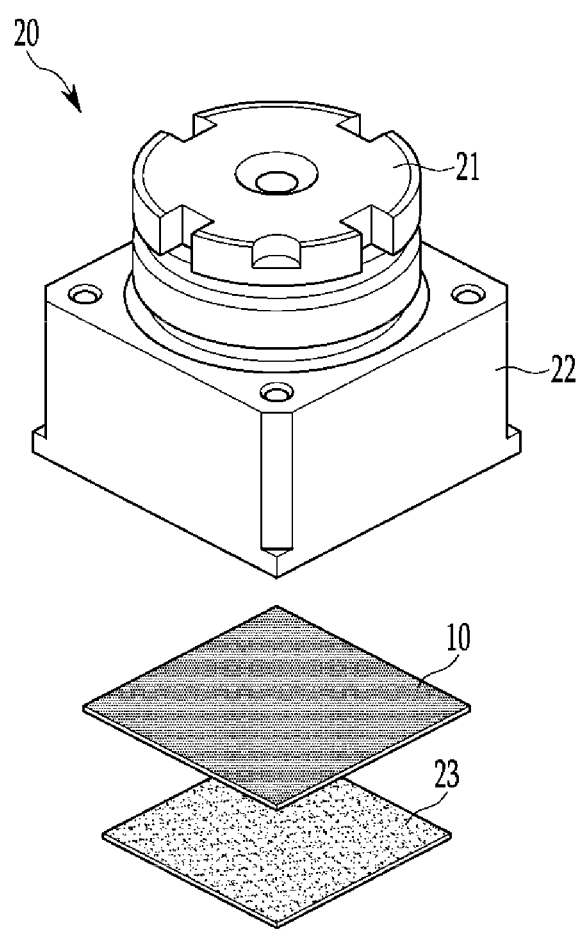
FIG. 3 is a schematic view showing a camera module according to an embodiment.

FIG. 3 is a schematic view of a camera module according to an embodiment.

Referring to FIG. 3, a camera module 20 includes a lens barrel 21, a housing 22, an optical structure 10, and an image sensor 23.

The lens barrel 21 includes at least one lens imaging a subject, and the lens may be disposed along an optical axis direction. Herein, the optical axis direction may be a vertical direction of the lens barrel 21.

The lens barrel 21 is internally housed in the housing 22 and united with the housing 22. The lens barrel 21 may be moved in optical axis direction inside the housing 22 for autofocusing.

The housing 22 supports and houses the lens barrel 21 and may be open in the optical axis direction. Accordingly, incident light from one surface of the housing 22 may reach the image sensor 21 through the lens barrel 21 and the optical structure 10.

The housing 22 may be equipped with an actuator for moving the lens barrel 21 in the optical axis direction. The actuator may include a voice coil motor (VCM) including a magnet and a coil. However, various methods such as a mechanical driving system or a piezoelectric driving system using a piezoelectric device other than the actuator may be adopted.

The optical structure 10 is the same as described above.

The image sensor 23 may concentrate an image of a subject and thus store it as data, and the stored data may be displayed as an image through a display media.

The image sensor 23 may be mounted in a substrate (not shown) and electrically connected to the substrate. The substrate may be, for example, a printed circuit board (PCB) or electrically connected to a printed circuit board, and the printed circuit may be, for example, a flexible printed circuit (FPCB).

The image sensor 23 concentrates light passing the lens barrel 21 and the optical structure 10 and generates a video signal and may be a complementary metal-oxide semiconductor (CMOS) image sensor and/or a charge coupled device (CCD) image sensor.

Figure 4:
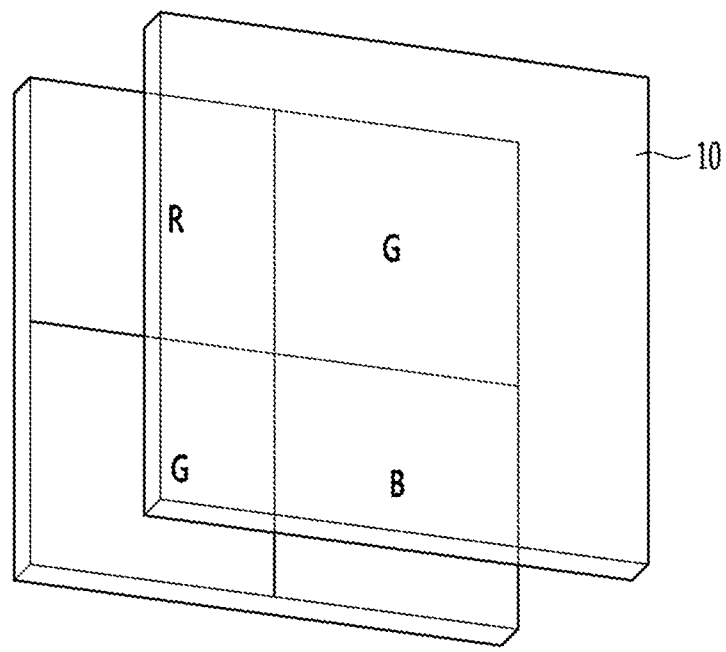
FIG. 4 is a top plan view showing an organic image sensor as one example of an image sensor.

FIG. 4 is a top plan view showing an organic image sensor as one example of an image sensor.

Referring to FIG. 4, the organic image sensor may be formed by arranging a red organic photoelectric device, a green organic photoelectric device, and a blue organic photoelectric device as Bayer shape in a monolayer on an optical structure, as shown in FIG. 4.

However, an embodiment is necessarily limited thereto, a detailed structures of organic image sensors may be variously set with a kind of materials and structures of the optical structure, and the like.

Figure 5:
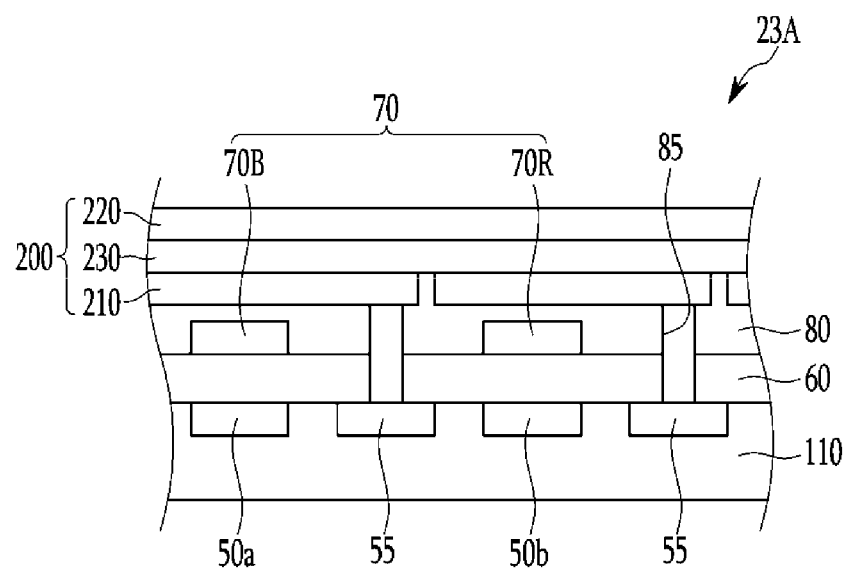
FIG. 5 is a cross-sectional view showing another example of the organic image sensor.

FIG. 5 is a cross-sectional view showing another example of the organic CMOS image sensor.

Referring to FIG. 5, an organic image sensor 23A according to an embodiment includes a semiconductor substrate 110 integrated with photo-sensing devices 50a and 50b, a transmission transistor (not shown), and a charge storage 55, a lower insulation layer 60, a color filter layer 70, a upper insulation layer 80, and an organic photoelectric device 200.

The semiconductor substrate 110 may be a silicon substrate, and is integrated with the photo-sensing devices 50a and 50b, the transmission transistor (not shown), and the charge storage 55. The photo-sensing devices 50a and 50b may be photodiodes.

The photo-sensing devices 50a and 50b sense light, the information sensed by the photo-sensing devices may be transferred by the transmission transistor, the charge storage 55 is electrically connected to the organic photoelectric device 100, and the information of the charge storage 55 may be transferred by the transmission transistor.

The photo-sensing devices 50a and 50b sense light, the information sensed by the photo-sensing devices may be transferred by the transmission transistor, the charge storage 55 is electrically connected to the organic photoelectric device 100, and the information of the charge storage 55 may be transferred by the transmission transistor.

A metal wire (not shown) and a pad (not shown) are formed on the semiconductor substrate 110. In order to decrease signal delay, the metal wire and pad may be made of a metal having low resistivity, for example, aluminum (Al), copper (Cu), silver (Ag), and alloys thereof, but is not limited thereto. However, it is not limited to the structure, and the metal wire and pad may be disposed under the photo-sensing devices 50a and 50b.

The lower insulation layer 60 is formed on the metal wire and the pad. The lower insulation layer 60 may be made of an inorganic insulating material such as a silicon oxide and/or a silicon nitride, or a low dielectric constant (low K) material such as SiC, SiCOH, SiCO, and SiOF. The lower insulation layer 60 has a trench exposing the charge storage 55. The trench may be filled with fillers.

A color filter layer 70 is formed on the lower insulation layer 60. The color filter layer 70 includes a blue filter 70a formed in the blue pixel and a red filter 70b formed in the red pixel. In the present embodiment, a green filter is not included, but a green filter may be further included.

The upper insulation layer 80 is formed on the color filter layer 70. The upper insulation layer 80 eliminates a step caused by the color filter layer 70 and smoothes the surface. The upper insulation layer 80 and lower insulation layer 60 may include a contact hole (not shown) exposing a pad, and a through-hole 85 exposing the charge storage 55 of a green pixel.

The organic photoelectric device 200 is formed on the upper insulation layer 80. The organic photoelectric device 200 includes a lower electrode 210 and an upper electrode 220 facing each other and an absorption layer 230 disposed between the lower electrode 210 and the upper electrode 220.

The lower electrode 210 and the upper electrode 220 may be all light-transmitting electrodes and the absorption layer 230 may selectively absorb light in a green wavelength region and may replace a color filter of a green pixel.

As described above, the semiconductor substrate 110 and the organic photoelectric device 200 selectively absorbing light in a green wavelength region have a stack structure and thereby the size of an image sensor may be reduced to realize a down-sized image sensor.

Focusing lens (not shown) may be further formed on the organic photoelectric device 200. The focusing lens may control a direction of incident light and gather the light in one region. The focusing lens may have a shape of, for example, a cylinder or a hemisphere, but is not limited thereto.

In FIG. 5, a structure where the organic photoelectric device selectively absorbing light in a green wavelength region is stacked on the semiconductor substrate 110 is illustrated, but the present disclosure is not limited thereto. An organic photoelectric device selectively absorbing light in a blue wavelength region may be stacked on the semiconductor substrate 110 and a green photo-sensing device and a red photo-sensing device may be integrated in the semiconductor substrate 110 or an organic photoelectric device selectively absorbing light in a red wavelength region may be stacked on the semiconductor substrate 110 and a green photo-sensing device and a blue photo-sensing device may be integrated in the semiconductor substrate 110.

Among the light in a visible region passing the lens barrel 21 and the optical structure 10, light in a green wavelength region may be mainly absorbed in the absorption layer 30 and photoelectrically converted, and light in a blue wavelength region and a red wavelength region may pass the lower electrode 210 and be sensed by the photo-sensing devices 50a and 50b.

As described above, the optical structure 10 has improved near-infrared absorbance and low visible absorbance and thereby may transfer pure light in a visible region to an image sensor and resultantly, reduce or prevent a crosstalk generated when a signal by light in a visible region and a signal by light in a non-visible region are crossed and mixed in. Accordingly, an optical distortion phenomenon of the image sensor may be limited and/or minimized and clear image may be obtained.

Hereinafter, the embodiments are illustrated in more detail with reference to examples. However, these examples are non-limiting, and the present scope is not limited thereto.

PREPARATION OF COPPER COMPLEX

Preparation Example 1

10 g of copper (II) acetate (Alfa Aesar) is dissolved in a tetrahydrofuran solvent using a magnetic stirrer, 6.28 g of trifluoromethylacetic acid is added thereto, and the mixture is reacted at room temperature for 1 day. 6.06 g of methyl phosphate (a mono/di mixture, TCI Inc.) is added to the reaction solution, and the mixture is reacted at room temperature for 1 day. A nonreactant particle in the reaction solution is removed through a syringe filter, about ½ of tetrahydrofuran is removed with a rotary evaporator, and a precipitate is obtained therefrom by using hexane, and filtered, and dried at room temperature to 50° C. in a vacuum oven for 12 hours to prepare a copper complex represented by Chemical Formula 1-1.

[Chemical Formula 1-1]

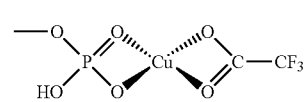

Preparation Example 2

A copper complex represented by Chemical Formula 1-2 is prepared according to the same method as Preparation Example 1 except for using 10 g of copper acetate, 6.28 g of trifluoromethyl acetic acid (TCI Inc.), and 7.75 g of ethylphosphate (a mono/di mixture, TCI Inc.).

[Chemical Formula 1-2]

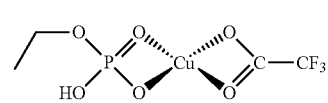

Preparation Example 3

A copper complex represented by Chemical Formula 1-3 is prepared according to the same method as Preparation Example 1 except for using 10 g of copper acetate, 6.28 g of trifluoromethyl acetic acid (TCI Inc.), and 11.03 g of isopropyl phosphate (TCI Inc.).

[Chemical Formula 1-3]

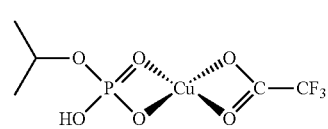

Preparation Example 4

A copper complex represented by Chemical Formula 1-4 is prepared according to the same method as Preparation Example 1 except for using 10 g of copper acetate, 6.28 g of trifluoromethyl acetic acid (TCI Inc.), and 13.77 g of diphenyl phosphate (TCI Inc.).

[Chemical Formula 1-4]

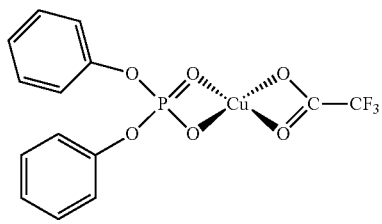

Preparation Example 5

A copper complex represented by Chemical Formula 1-5 is prepared according to the same method as Preparation Example 1 except for using 10 g of copper acetate, 6.28 g of trifluoromethyl acetic acid (TCI Inc.), and 11.57 g of phosphoric acid 2-hydroxy metacryl ester (Sigma-Aldrich Corp.).

[Chemical Formula 1-5]

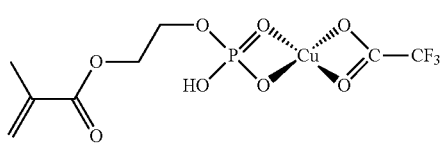

Preparation Example 6

A copper complex represented by Chemical Formula 1-6 is prepared according to the same method as Preparation Example 1 except for using 10 g of copper acetate, 6.28 g of trifluoromethyl acetic acid (TCI Inc.), and 10.47 g of para-toluene sulfonic acid (Daejung Chemicals & Metals Co., Ltd.).

[Chemical Formula 1-6]

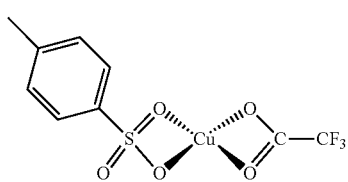

Comparative Preparation Example 1

A copper complex represented by Chemical Formula 2-1 (commercially available from Sigma-Aldrich Corp.) is used as a copper complex according to Comparative Preparation Example 1.

[Chemical Formual 2-1]

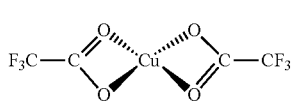

Comparative Preparation Example 2

A copper complex represented by Chemical Formula 2-2 is prepared by performing a 1st step reaction by using 10 g of copper acetate and 23.14 g of phosphoric acid 2-hydroxy metacryl ester (Sigma-Aldrich Corp.) and then, the rest processes such as purification and the like according to the same method as preparation example 1.

[Chemical Formula 2-2]

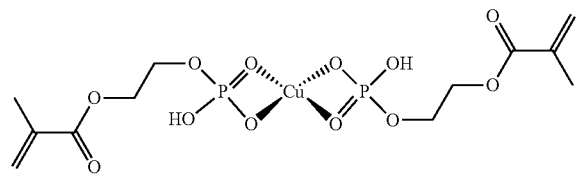

Comparative Preparation Example 3

A copper complex represented by Chemical Formula 2-3 is prepared by performing a 1st step reaction by using 10 g of copper acetate and 12.12 g of methyl phosphate (a mono/di mixture, TCI Inc.) and then, the rest processes such as purification and the like according to the same method as Preparation Example 1.

[Chemical Formula 2-3]

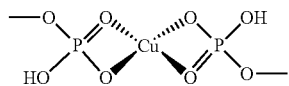

PREPARATION OF NEAR-INFRARED ABSORBING COMPOSITION

Examples 1 to 6

Each copper complex according to Preparation Examples 1 to 6 is dissolved in a concentration of 10 mg/mL in tetrahydrofuran (THF) to respectively prepare near-infrared absorbing compositions according to Examples 1 to 6.

Examples 7 to 10

Each near-infrared absorbing composition according to Examples 7 to 10 is prepared according to the same method as Example 1 except for using ethanol (Example 7), butanol (Example 8), acetone (Example 9), and cyclopentanone (Example 10) instead of THF as an organic solvent but in the same concentration as above.

Comparative Examples 1 to 3

Each near-infrared absorbing composition according to Comparative Examples 1 to 3 is prepared according to the same method as Example 1 except for respectively using the copper complexes according to Comparative Examples 1 to 3 instead of the copper complexes according to Preparation Examples 1 to 6.

Comparative Examples 4 to 7

Each near-infrared absorbing composition according to Comparative Examples 4 to 7 is prepared according to the same method as Comparative Example 3 except for respectively using ethanol (Comparative Example 4), butanol (Comparative Example 5), acetone (Comparative Example 6), and cyclopentanone (Comparative Example 7) instead of THF as an organic solvent but in the same concentration as above.

On the other hand, each wavelength vs. absorbance graph of the near-infrared absorbing compositions according to Examples 1 to 6 and Comparative Examples 1 to 2 is obtained by using a UV-Vis spectrophotometer (SoldiSpec-3700, Shimadzu Corp.).

Figure 6:
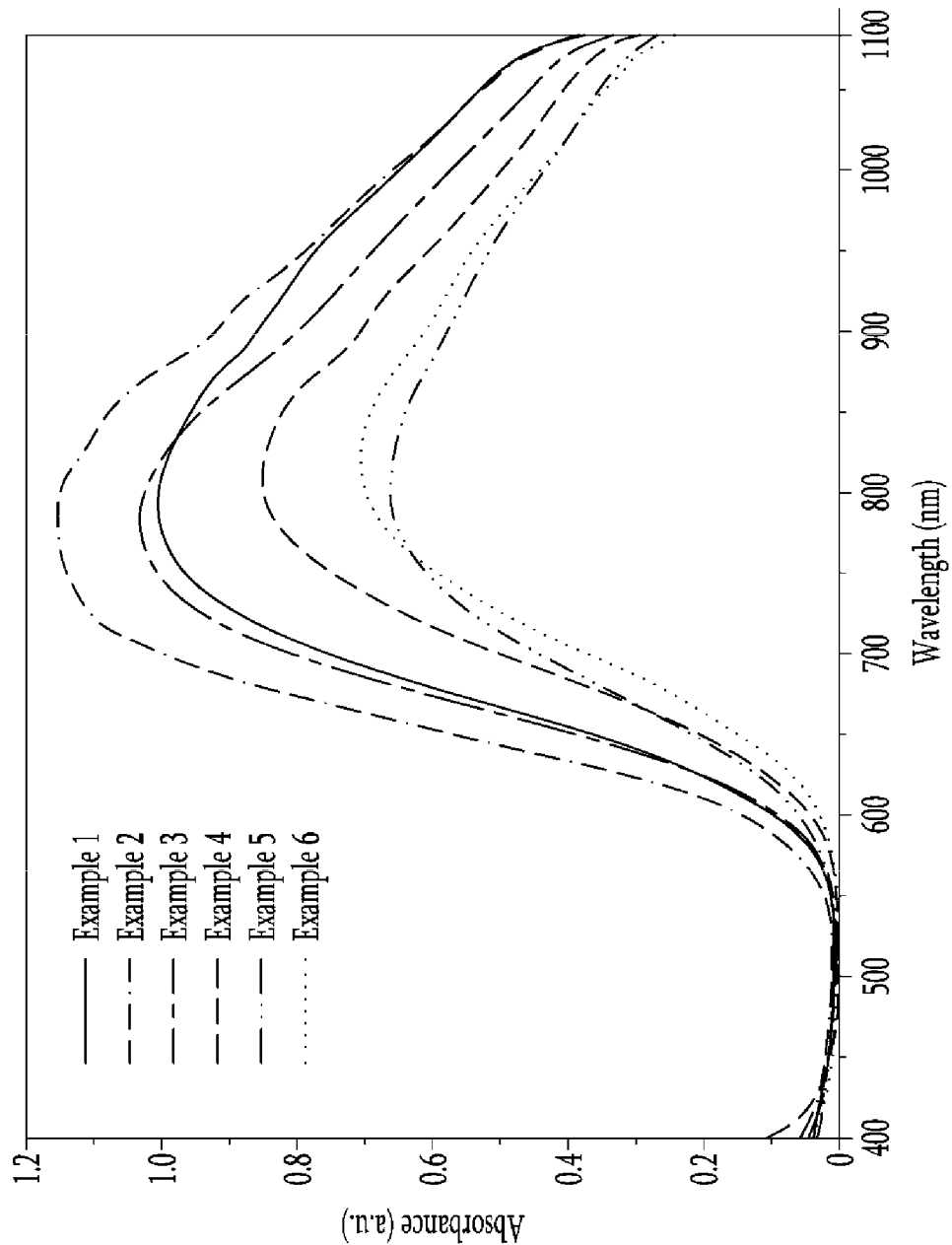
FIG. 6 is a graph showing absorbance verse a wavelength of the near-infrared absorbing compositions according to Example 1 to Example 6.

Herein, the wavelength vs. absorbance graphs of the near-infrared absorbing compositions according to Examples 1 to 6 are shown in FIG. 6.

On the other hand, regarding the near-infrared absorbing compositions according to Examples 1 to 6 and Comparative Examples 1 to 2, an organic solvent, solubility in the organic solvent, and a maximum absorption wavelength ($\lambda$NIR), maximum absorbance (ANIR), and average absorbance ($A_{430\text{-}565}$) in a visible light wavelength region (435 nm to 565 nm) obtained from the obtained wavelength vs. absorbance graphs are summarized and shown in Table 1.

TABLE 1

| | Copper complex | Organic solvent | Solubility | $\lambda_{NIR}$ [nm] | $A_{NIR}$ | $A_{430\text{-}565}$ |
|---|---|---|---|---|---|---|
| Example 1 | [Chemical Formula 1-1] | THF | ○ | 806 | 1.01 | 0.009 |
| Example 2 | [Chemical Formula 1-2] | THF | ○ | 794 | 1.16 | 0.013 |
| Example 3 | [Chemical Formula 1-3] | THF | ○ | 794 | 1.04 | 0.008 |
| Example 4 | [Chemical Formula 1-4] | THF | ○ | 814 | 0.85 | 0.005 |
| Example 5 | [Chemical Formula 1-5] | THF | ○ | 814 | 0.66 | 0.010 |
| Example 6 | [Chemical Formula 1-6] | THF | ○ | 825 | 0.70 | 0.006 |
| Comparative Example 1 | [Chemical Formula 2-1] | THF | ○ | 771 | 1.05 | 0.020 |
| Comparative Example 2 | [Chemical Formula 2-2] | THF | ○ | 826 | 0.42 | 0.001 |

In Table 1, the "solubility" is evaluated as °, when greater than or equal to 50 wt % of a copper complex based on 100 wt % of an entire composition is dissolved in a corresponding organic solvent, and as X, when less than 50 wt % of a copper complex based on 100 wt % of an entire composition is dissolved in a corresponding organic solvent, and "$A_{NIR}$" is measured under a THF concentration condition of 10 mg/m L.

Referring to FIG. 6 and Table 1, the near-infrared absorbing compositions according to Examples 1 to 6 show excellent solubility in an organic solvent (THF) compared with the ones according to Comparative Examples and have a maximum absorption wavelength of about 790 nm to about 900 nm, absorbance of greater than or equal to 0.6, and average absorbance of less than 0.02 in a visible light wavelength region. The near-infrared absorbing compositions according to Examples 1 to 3 maintain excellent solubility in THF, near-infrared absorption capability, and light transmittance capability in a visible light wavelength region, even though a linear length of an aliphatic hydrocarbon group of a phosphate-based ligand is increased (Example 2), or a branch-type hydrocarbon group is substituted (Example 3).

The near-infrared absorbing compositions according to Examples 1, 4, and 5 show a maximum absorption wavelength shift of about 8 nm to 20 nm toward a long wavelength as well as maintain excellent solubility in THF, near-infrared absorption capability, and light transmittance capability in a visible light wavelength region light, even though an aromatic hydrocarbon group is substituted for the phosphate-based ligand (Example 4), or a photopolymerizable functional group is substituted (Example 5).

The maximum absorption wavelength shift is regarded to be caused from each molecular structural role of an aromatic hydrocarbon group and a photopolymerizable functional group.

The copper complex according to Example 6 has a sulfonate-based ligand instead of a phosphate-based ligand but respectively maintain excellent solubility in THF, near-infrared absorption capability, and light transmittance capability in a visible light wavelength region. However, the copper complex according to Example 6 shows a high maximum absorption wavelength of 825 nm unlike the copper complexes according to Examples 1 to 5, which is regarded to be caused from a different molecular structural role of a sulfonate-based ligand from that of a phosphate-based ligand.

The copper complexes according to Examples and Comparative Example 1 have the same kinds of trifluoromethyl acetate ligands and show a near-infrared maximum absorption wavelength shift moving 23 to 54 nm toward a short wavelength and thus have a drawback of increasing an absorption detail in a visible region.

The copper complexes according to Examples and Comparative Example 2 have the same kinds of phosphate ligands and thus near-infrared maximum absorbance of 0.42, which is 1.5 to 2.8 times low near-infrared absorbance compared with that of a copper complex having a heterogeneous ligand.

Referring to the results, the near-infrared absorbing compositions according to Examples have two different kinds of ligands and thus excellent near-infrared absorbance, low visible absorbance, and solubility in organic solvent compared with the near-infrared absorbing compositions having the same kinds of ligands according to Comparative Examples.

On the other hand, Table 2 show an organic solvent used in the near-infrared absorbing compositions according to Examples 1 to 10 and Comparative Examples 1 to 7 and solubility in the organic solvent. In Table 2, "solubility" uses the same reference as Table 1.

TABLE 2

| | Copper complex | Organic solvent | Solubility |
|---|---|---|---|
| Example 7 | [Chemical Formula 1-1] | ethanol | ○ |
| Example 8 | [Chemical Formula 1-1] | butanol | ○ |
| Example 9 | [Chemical Formula 1-1] | acetone | ○ |
| Example 10 | [Chemical Formula 1-1] | cyclopentanone | ○ |
| Comparative Example 3 | [Chemical Formula 2-3] | THF | x |
| Comparative Example 4 | [Chemical Formula 2-3] | ethanol | x |
| Comparative Example 5 | [Chemical Formula 2-3] | butanol | x |
| Comparative Example 6 | [Chemical Formula 2-3] | acetone | x |
| Comparative Example 7 | [Chemical Formula 2-3] | cyclopentanone | x |

Referring to Table 2, the near-infrared absorbing compositions according to Examples 7 to 10 show excellent solubility even though various organic solvents except for THF are used, but the near-infrared absorbing compositions according to Comparative Examples 4 to 7 show insufficient solubility in the various organic solvents.

Referring to the results of Table 2, the near-infrared absorbing compositions according to Examples have two different kinds of ligands for respectively improving solubility in an organic solvent and near-infrared absorption capability and thus secure excellent solubility in various organic solvents compared with the ones only having a ligand for improving near-infrared absorption capability according to Comparative Examples 3 to 7. On the other hand, FIG. 7 shows wavelength vs. absorbance curves of the near-infrared absorbing compositions according to Example 1 and Comparative Example 1, and Table 3 shows an area of each near-infrared wavelength region and a cut-off wavelength respectively calculated from the curves of FIG. 7.

TABLE 3

|  | Absorption area of near-infrared wavelength region | Cut-off wavelength [nm] |
| --- | --- | --- |
| Example 1 | 361 | 646 |
| Comparative Example 1 | 328 | 636 |

Figure 7:
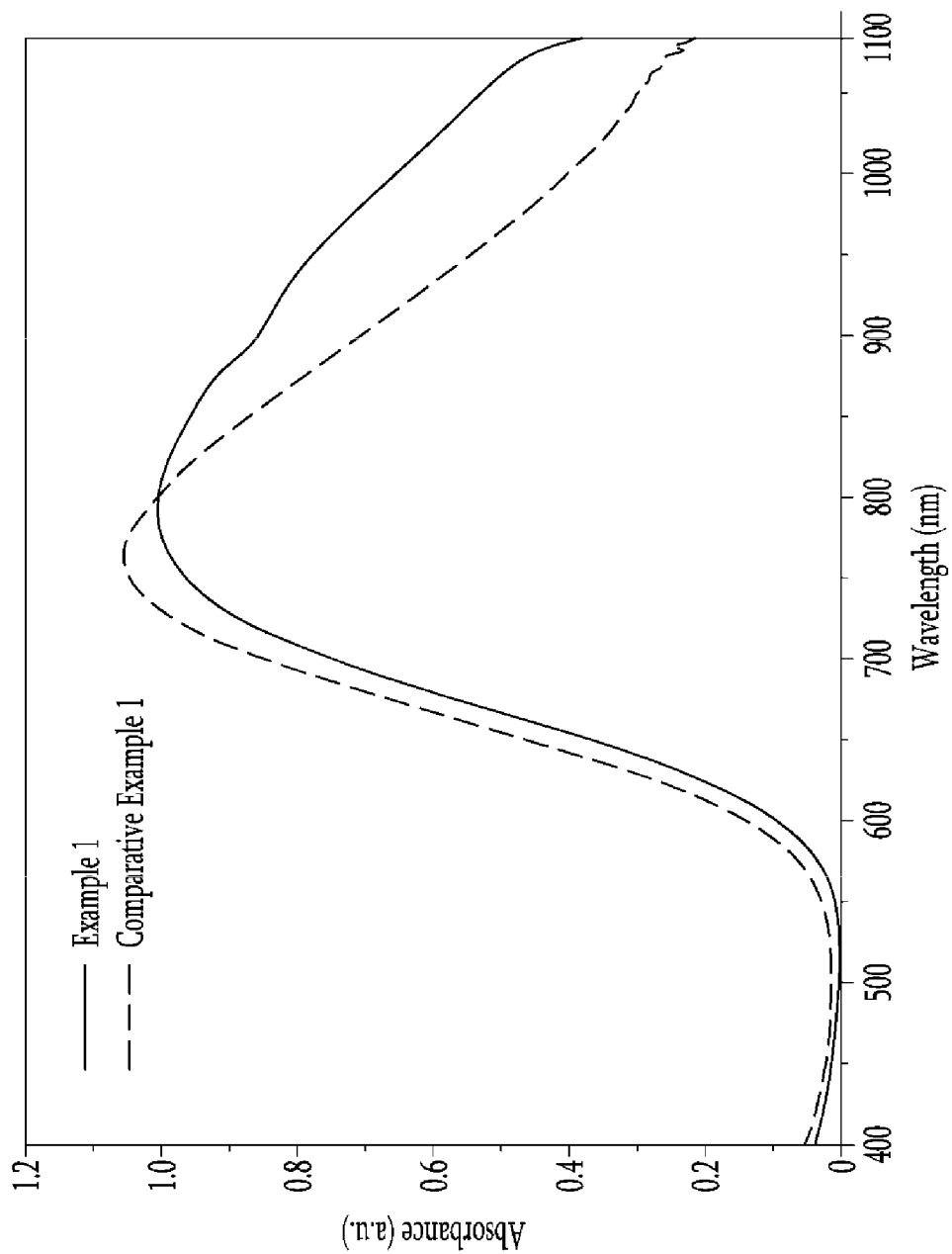
FIG. 7 is a graph showing absorbance verse a wavelength of the near-infrared absorbing compositions according to Example 1 and Comparative Example 1.

In Table 3, the "absorption area of a near-infrared wavelength region" is an area obtained by integrating each curve in a wavelength range from 700 nm to 1100 nm in FIG. 7, and the "cut-off wavelength" is a wavelength where each curve has light transmittance of 50% after normalizing absorbance corresponding to a y-axis of FIG. 7 to have a maximum absorbance of 1 and then, converting the normalized absorbance (An) into light transmittance (T) to satisfy Equation 1.

$$T\ (\%) = 10^{(2-An)}. \qquad \text{[Equation 1]}$$

Referring to Table 3, the near-infrared absorbing composition according to Example 1 shows a cut-off wavelength about 10 nm shifted toward a long wavelength compared with the near-infrared absorbing composition according to Comparative Example 1, and an area covering the near-infrared wavelength region is also large. In other words, referring to the results of Table 3, the near-infrared absorbing composition having two different kinds of ligands according to Example 1 may have excellent near-infrared wavelength absorption capability compared with the near-infrared absorbing composition having the same kinds of ligands according to Comparative Example 1.

Figure 8:
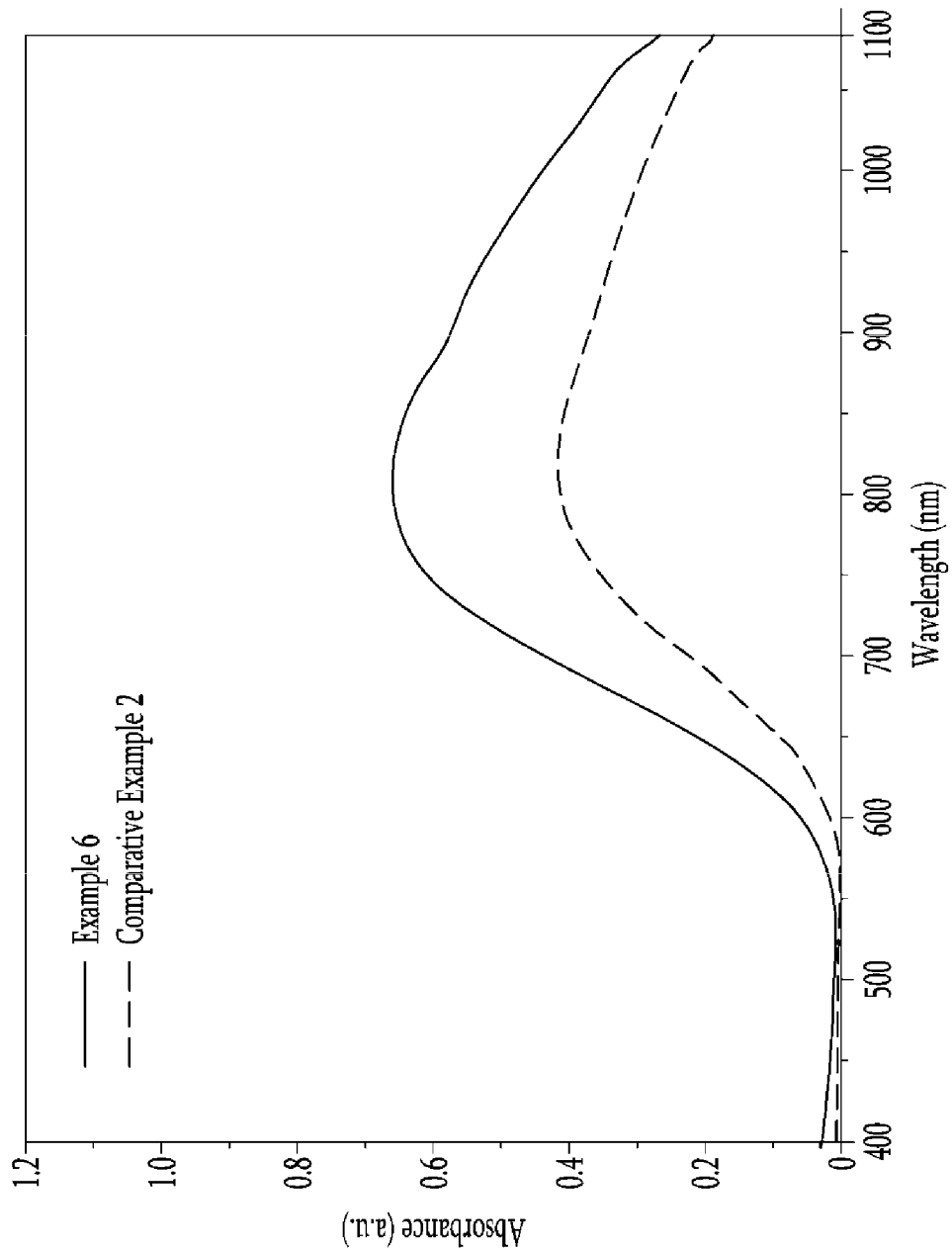
FIG. 8 is a graph showing absorbance verse a wavelength of the near-infrared absorbing compositions according to Example 6 and Comparative Example 2.

On the other hand, FIG. 8 shows wavelength vs. absorbance curves of the near-infrared absorbing compositions according to Example 6 and Comparative Example 2, and Table 4 shows an area of a near-infrared wavelength region calculated from each curve of FIG. 8 and a cut-off wavelength. In Table 4, the "absorption area of a near-infrared wavelength region" and the "cut-off wavelength" is equally defined as in Table 3.

TABLE 4

|  | Absorption area of near-infrared wavelength region | Cut-off wavelength [nm] |
| --- | --- | --- |
| Example 6 | 234 | 676 |
| Comparative Example 2 | 144 | 740 |

Referring to Table 4, the near-infrared absorbing composition according to Example 6 shows a cut-off wavelength of 676 nm, but the near-infrared absorbing composition according to Comparative Example 2 shows too high a cut-off wavelength of 740 nm, and accordingly, an area of the near-infrared wavelength region of Example 6 is larger than that of the near-infrared wavelength region of Comparative Example 2. Accordingly, referring to the results of Table 4, the near-infrared absorbing composition having two different kinds of ligands according to Example 6 shows no extremely high cut-off wavelength and thus has excellent near-infrared wavelength absorption capability compared with the near-infrared absorbing composition having the same kinds of ligands according to Comparative Example 2.

Manufacture of Optical Structure

EXAMPLE 11

The copper complex of Example 1 is dissolved to be a weight of 50% in tetrahydrofuran (THF), the copper complex and an epoxy binder (EHPE-3150, Daicell Corp.) are dissolved in each amount of 91% and 9% to prepare a near-infrared absorbing composition, and the near-infrared absorbing composition is bar-coated on an about 40 μm-thick triacetyl cellulose (TAC) film and photocured with a UV dose of about 500 mJ to form an optical structure including an about 100 μm-thick near-infrared absorption layer on the TAC film.

EXAMPLE 12

An optical structure is formed according to the same method as Example 11 except for using the near-infrared absorbing composition of Example 2 instead of the near-infrared absorbing composition of Example 1.

Figure 9:
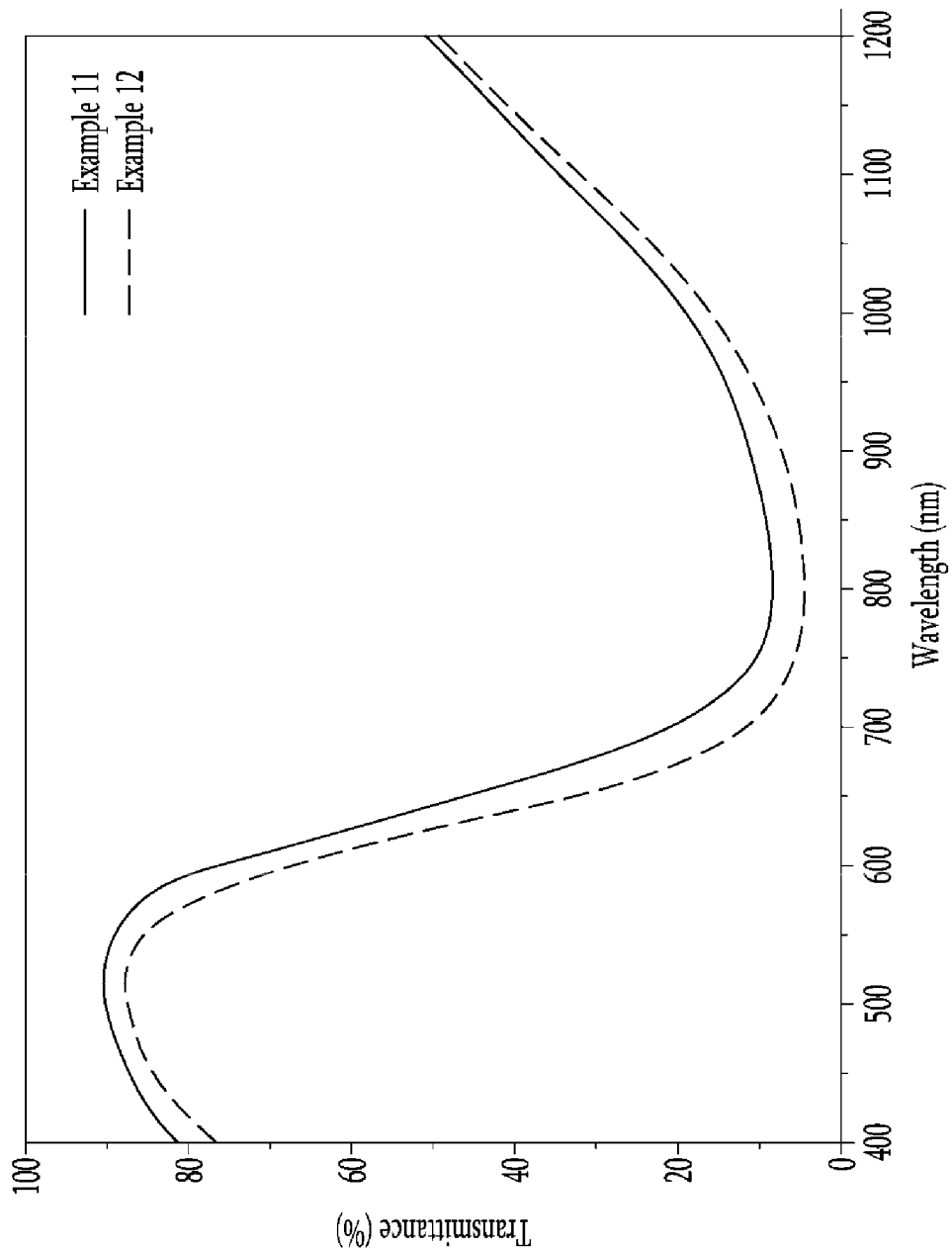
FIG. 9 is a graph showing a light transmittance verse a wavelength of the optical structures according to Example 11 to Example 12.

On the other hand, wavelength vs. light transmittance graphs of the optical structures according to Examples 11 to 12 are calculated by using a UV-Vis spectrophotometer (SoldiSpec-3700, Shimadzu Corp.) and shown in FIG. 9.

In addition, a copper complex amount in the near-infrared absorption layers of the optical structures according to Examples 11 to 12 and Comparative Examples 7 to 8 and in addition, an average light transmittance per each wavelength region obtained from FIG. 9 and a cut-off wavelength are respectively shown in Table 5.

TABLE 5

|  | Amount of copper complex [wt %] | Average light transmittance [%] | | | | | Cut-off wavelength [nm] |
| --- | --- | --- | --- | --- | --- | --- | --- |
|  |  | 430 nm-565 nm | 700 nm-740 nm | 740 nm-1000 nm | 1000 nm-1200 nm | 700 nm-1200 nm |  |
| Example 11 | 91% | 88.9 | 15.7 | 11.5 | 35.0 | 21.3 | 644 |
| Example 12 | 91% | 88.2 | 8.0 | 7.6 | 32.4 | 17.6 | 626 |

Referring to FIG. 9 and Table 5 together, the near-infrared absorbing compositions according to Examples 1 to 10 may be formed into a film-shaped structure. In addition, the optical structures according to Examples 11 to 12 show excellent transmittance about a visible light wavelength region but low transmittance about a near-infrared wavelength region. Accordingly, the optical structures according to Examples include a copper complex having two different kinds of ligands and thus show excellent near-infrared absorbance and low visible absorbance.

While this disclosure has been described in connection with what is presently considered to be practical example embodiments, it is to be understood that inventive concepts are not limited to the disclosed embodiments, but, on the contrary, are intended to cover various modifications and equivalent arrangements included within the spirit and scope of the appended claims.

What is claimed is:

1. A near-infrared absorbing composition, comprising a copper complex represented by Chemical Formula 1:

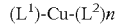   [Chemical Formula 1]

In Chemical Formula 1,
$L^1$ is a ligand represented by Chemical Formula A,
$L^2$ is a ligand selected from the group consisting of a substituted or unsubstituted phosphate group, a substituted or unsubstituted phosphonate group, a substituted or unsubstituted sulfate group, and a substituted or unsubstituted sulfonate group, and
n is 1 to 4,

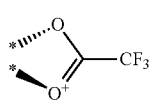   [Chemical Formula A]

wherein, in Chemical Formula A,
* is a linking point with Cu.

2. The near-infrared absorbing composition of claim 1, wherein $L^2$ is represented by Chemical Formula B:

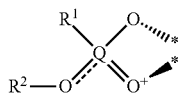   [Chemical Formula B]

wherein, in Chemical Formula B,
Q is S or P,
$R^1$ and $R^2$ are independently selected from the group consisting of hydrogen, deuterium, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C4 to C20 heteroaryl group, $-OR^{b1}$, $-C(=O)R^{b2}$, $-OC(=O)R^{b3}$, (wherein $R^{b1}$, $R^{b2}$, and $R^{b3}$ are independently selected from the group consisting of hydrogen, deuterium, a substituted or unsubstituted C1 to C20 alkyl group, a substituted or unsubstituted C1 to C20 alkenyl group, a substituted or unsubstituted C6 to C20 aryl group, and a substituted or unsubstituted C4 to C20 heteroaryl group), and a functional group represented by Chemical Formula X, and
* is a linking point with Cu,

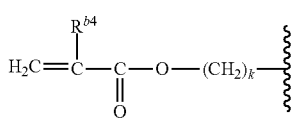   [Chemical Formula X]

wherein, in Chemical Formula X,
$R^{b4}$ is selected from the group consisting of hydrogen, deuterium, a substituted or unsubstituted C1 to C20 alkyl group, a substituted or unsubstituted C1 to C20 heteroalkyl group, a substituted or unsubstituted C6 to C20 aryl group, and a substituted or unsubstituted C4 to C20 heteroaryl group, and
k is an integer ranging from 0 to 8.

3. The near-infrared absorbing composition of claim 1, wherein $L^2$ is a ligand represented by Chemical Formula B-1:

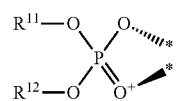   [Chemical Formula B-1]

wherein, in Chemical Formula B-1,
$R^{11}$ and $R^{12}$ are independently selected from the group consisting of hydrogen, deuterium, a substituted or unsubstituted C1 to C20 alkyl group, a substituted or unsubstituted C1 to C20 heteroalkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C4 to C20 heteroaryl group, and a functional group represented by Chemical Formula X, and
* is a linking point with Cu,

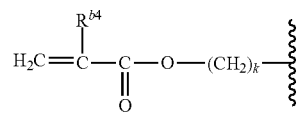   [Chemical Formula X]

wherein, in Chemical Formula X,
$R^{b4}$ is selected from the group consisting of hydrogen, deuterium, a substituted or unsubstituted C1 to C20 alkyl group, a substituted or unsubstituted C1 to C20 heteroalkyl group, a substituted or unsubstituted C6 to C20 aryl group, and a substituted or unsubstituted C4 to C20 heteroaryl group, and
k is an integer ranging from 0 to 8.

4. The near-infrared absorbing composition of claim 3, wherein at least one of $R^{11}$ and $R^{12}$ is selected from the group consisting of a substituted or unsubstituted C1 to C10 linear or branched alkyl group, a substituted or unsubstituted C1 to C10 aryl group, and the functional group represented by Chemical Formula X.

5. The near-infrared absorbing composition of claim 1, wherein $L^2$ is a ligand represented by Chemical Formula B-2:

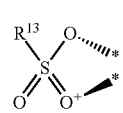   [Chemical Formula B-2]

wherein, in Chemical Formula B-2,
$R^{13}$ is selected from the group consisting of hydrogen, deuterium, a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C4 to C20 heteroaryl group, —OR$^{b1}$, —C(=O)$_R{}^{b2}$, —OC(=O)R$^{b3}$, (wherein R$^{b1}$, R$^{b2}$, and R$^{b3}$ are independently selected from the group consisting of hydrogen, deuterium, a substituted or unsubstituted C1 to C20 alkyl group, a substituted or unsubstituted C1 to C20 alkenyl group, a substituted or unsubstituted C6 to C20 aryl group, and a substituted or unsubstituted C4 to C20 heteroaryl group), and a functional group represented by Chemical Formula X, and

* is a linking point with Cu,

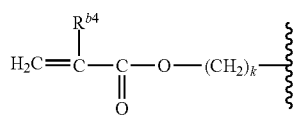

[Chemical Formula X]

wherein, in Chemical Formula X,

R$^{b4}$ is selected from the group consisting of hydrogen, deuterium, a substituted or unsubstituted C1 to C20 alkyl group, a substituted or unsubstituted C1 to C20 heteroalkyl group, a substituted or unsubstituted C6 to C20 aryl group, and a substituted or unsubstituted C4 to C20 heteroaryl group, and k is an integer ranging from 0 to 8.

6. The near-infrared absorbing composition of claim 5, wherein R$^{13}$ is selected from the group consisting of a substituted or unsubstituted C1 to 10 linear or branched alkyl group, and a substituted or unsubstituted C1 to C10 aryl group.

7. The near-infrared absorbing composition of claim 1, further comprising: one of tetrahydrofuran, ethanol, butanol, acetone, methylethylketone, 1-methoxy-2-propanol, cyclopentanone, or a combination thereof.

8. The near-infrared absorbing composition of claim 1, further comprising: a thermally or photo-cross-linkable monomer.

9. The near-infrared absorbing composition of claim 8, wherein the thermally or photo-cross-linkable monomer includes an acryl-based monomer, an epoxy-based monomer, or a combination thereof.

10. The near-infrared absorbing composition of claim 1, wherein the near-infrared absorbing composition has a maximum absorption wavelength of about 790 nm to about 900 nm.

11. An optical structure comprising:
   a near-infrared absorption layer formed using the near-infrared absorbing composition of claim 1.

12. The optical structure of claim 11, wherein the copper complex is included in an amount of about 50 wt % to about 100 wt % based on a total weight of the near-infrared absorption layer.

13. The optical structure of claim 11, wherein the near-infrared absorption layer further includes an acryl-based polymer, an epoxy-based polymer, or a combination thereof.

14. The optical structure of claim 11, further comprising:
   a transparent substrate contacting the near-infrared absorption layer.

15. The optical structure of claim 14, further comprising:
   a near-infrared reflection layer on at least one of one surface of the transparent substrate and one surface of the near-infrared absorption layer.

16. The optical structure of claim 11, wherein the optical structure has an average light transmittance of greater than or equal to about 80% in a wavelength region of about 430 nm to about 565 nm when measured at a thickness of about 140 μm.

17. The optical structure of claim 11, wherein the optical structure has an average light transmittance of less than or equal to about 15% in a wavelength region of about 740 nm to about 1000 nm wavelength region when measured at a thickness of about 140 μm.

18. The optical structure of claim 11, wherein the optical structure has an average light transmittance of less than or equal to about 25% in a wavelength region of about 700 nm to about 1200 nm when measured at a thickness of about 140 μm.

19. A camera module comprising
   a lens;
   an image sensor; and
   the optical structure of claim 11 between the lens and the image sensor.

20. An electronic device comprising:
   the optical structure of claim 11.

* * * * *